No. 716,919. Patented Dec. 30, 1902.
W. MIKS.
BAND CUTTER AND FEEDER.
(Application filed Feb. 13, 1902.)

(No Model.) 2 Sheets—Sheet 1.

WITNESSES, INVENTOR,
Walter Miks.
By Higdon & Higdon,
Att'ys.

No. 716,919. Patented Dec. 30, 1902.
W. MIKS.
BAND CUTTER AND FEEDER.
(Application filed Feb. 13, 1902.)
(No Model.) 2 Sheets—Sheet 2.

WITNESSES,
K.M. Imboden,
M. L. Lange

INVENTOR,
Walter Miks,
By Higdon & Higdon,
Attys.

UNITED STATES PATENT OFFICE.

WALTER MIKS, OF MAYFIELD, KANSAS.

BAND-CUTTER AND FEEDER.

SPECIFICATION forming part of Letters Patent No. 716,919, dated December 30, 1902.

Application filed February 13, 1902. Serial No. 93,938. (No model.)

*To all whom it may concern:*

Be it known that I, WALTER MIKS, a citizen of the United States, residing at Mayfield, in the county of Sumner and State of Kansas, have invented new and useful Improvements in Band-Cutters and Feeders, of which the following is a specification.

My invention relates to band-cutters and feeders; and the object of my invention is to produce radically new mechanism for separating or disintegrating the bundles as they approach the threshing-machine. I employ for this purpose three sets of rotary wheels provided with peripheral teeth, as hereinafter described.

A great advantage of my rotary separators is that they keep the grain lying straight across the conveyer, while all machines which employ oscillatory separators or spreaders cause tangling or "roping" of the grain.

Other objects and advantages of my invention will appear hereinafter.

Figure 1:
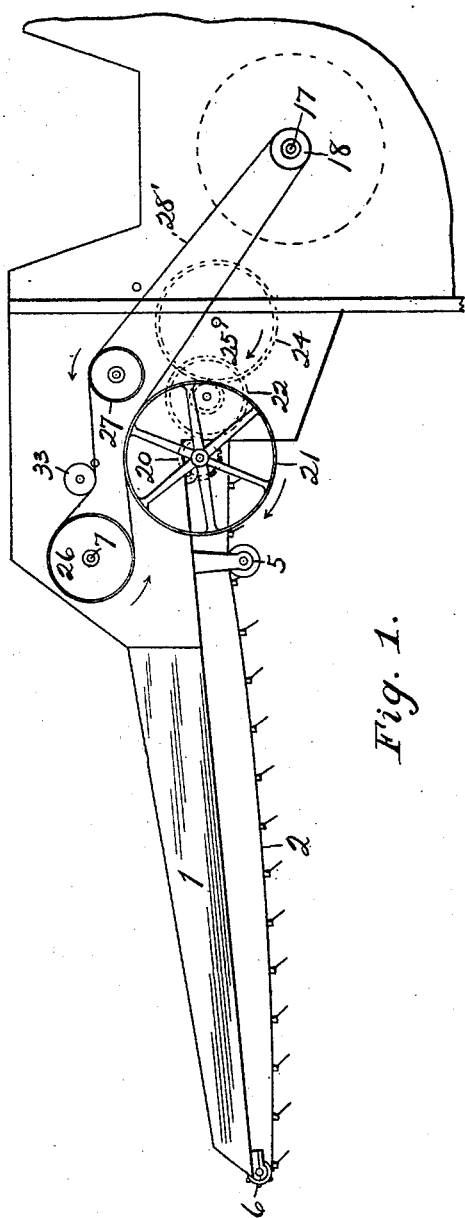
Figure 2:
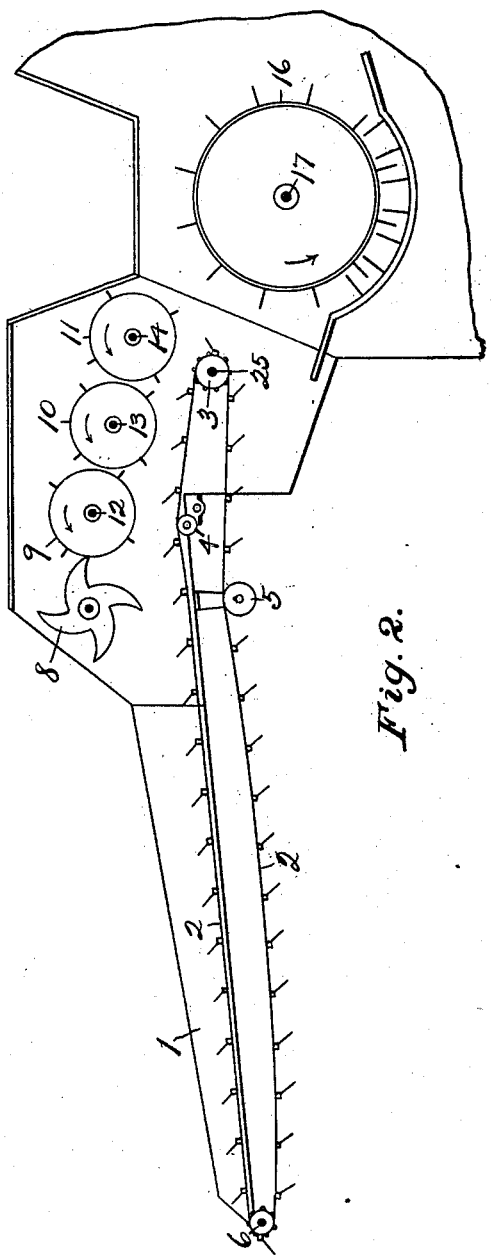
Figure 3:
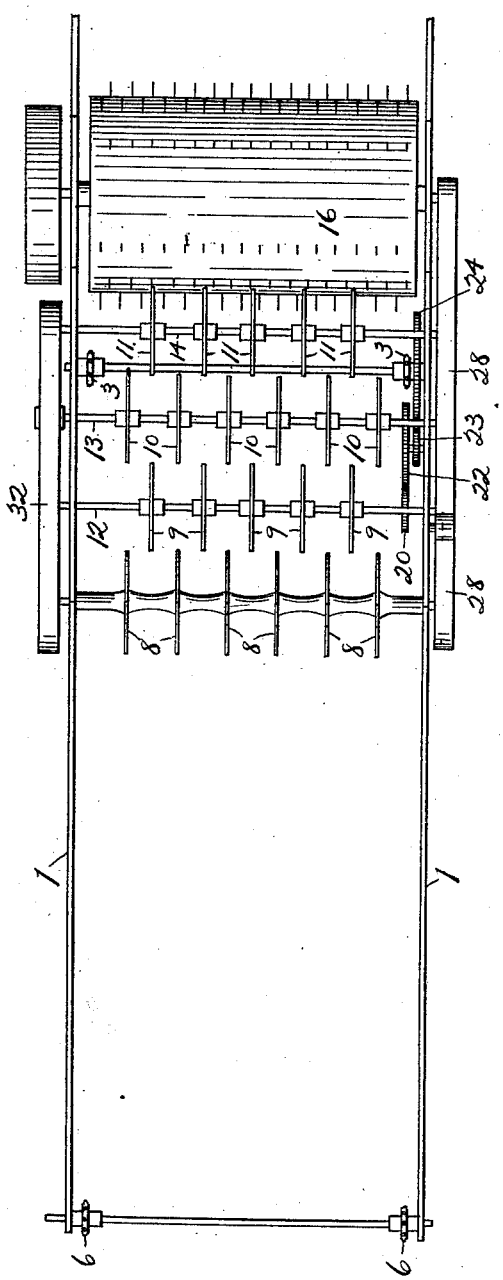
Figure 4:
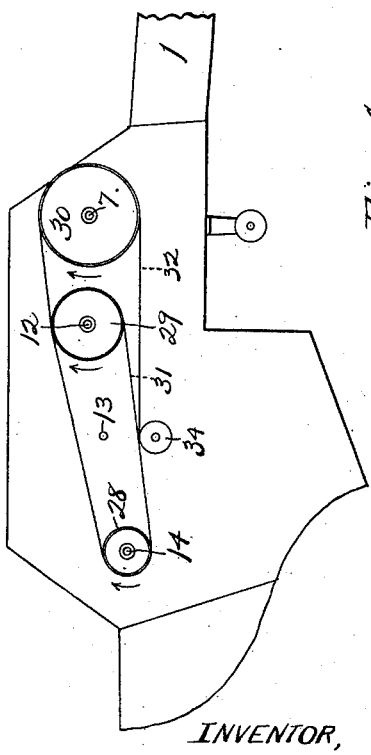

In the accompanying drawings, Figure 1 is a right-hand side elevation of a band-cutter and feeder embodying my invention, showing also the connected end of a threshing-machine broken away. Fig. 2 is a sectional side elevation showing the interior of the band-cutter and feeder and the threshing-cylinder. Fig. 3 is a top plan view of the band-cutter and feeder and the threshing-cylinder, omitting for clearness the conveyer. Fig. 4 represents the pulleys and belts on the left-hand side of the band-cutter and feeder.

The arrows in said views indicate the directions of rotation of the rotary parts.

1 1 designate the sides of the frame of the band-cutter and feeder. The conveyer 2, of usual construction, is actuated by sprockets 3 3 and is supported by rollers 4 5 and passes around sprockets 6 6 at the rear end of the conveyer-frame.

Mounted on a transverse rotatable shaft 7 above the conveyer 2 are a plurality of band-cutting wheels 8, each wheel comprising four curved knives, as shown.

In front of the band-cutting wheels 8 are three sets of separator-wheels 9 10 11, secured on rotatable shafts 12 13 14, respectively. Each wheel 9 10 11 is provided with peripheral teeth 15, which may be integral with said wheels or secured thereto.

16 designates the threshing-cylinder on a shaft 17. On said shaft 17 is a pulley 18. On a transverse shaft 19 are secured a spur-pinion 20 and a belt-pulley 21. Pinion 20 engages a gear-wheel 22, on the shaft of which is a pinion 23, which engages a gear-wheel 24, which is secured on the shaft 25, which carries the conveyer-driving sprockets 3 3. On the right-hand end of shaft 7 is a pulley 26, and on the right-hand end of shaft 13 is a pulley 27. A belt 28 passes around pulleys 26, 27, and 18 and over pulley 21, as shown in Fig. 1, thereby transmitting motion from the threshing-cylinder shaft 17 to the conveyer 2, cutting-wheels 8, and separators 9 10 11. On the left-hand side of the machine, Fig. 4, pulleys 28 29 30 are secured on shafts 14 12 7, respectively. A belt 31 connects pulleys 28 and 29, and a belt 32, running over belt 31, connects pulleys 28 and 30. 33 and 34 are belt-tightener pulleys for belts 28' and 32, respectively. Thus all three separator-shafts are driven in the same direction. The pulleys are proportioned so that the first set of separators 9 will make about six hundred revolutions per minute, the second set 10 about seven hundred per minute, and the third set 11 about eight hundred per minute. The effect of this is that the bundles are efficiently torn apart by the time the grain reaches the threshing-cylinder, and tendency to roping is obviated by the continuous motion of the separator-wheels.

The grain is carried toward the threshing-machine by the flights of the conveyer, and the band-cutters and separators then act on the grain, as described hereinbefore.

Having now fully described my invention, what I claim as new, and desire to secure by Letters Patent of the United States, is—

In a band-cutter and feeder, the combination of the four transverse shafts 7, 12, 13 and 14, a plurality of band-cutter wheels mounted on said shaft 7, a plurality of separator-wheels mounted on each of said other three shafts, peripheral teeth on said separator-wheels, pulleys 28, 29 and 30 on adjacent ends of shafts 14, 12, and 7, respectively, a belt connecting pulleys 28 and 29, a longer belt running over said belt and connecting pulleys 28 and 30, pulleys 27, 33 and 26 on the opposite ends of shafts 13, and 12, and 7, respectively, a conveyer-driving pulley 21, a threshing-cylinder-driving pulley 18, a belt passing over all five of said pulleys, and means for driving the threshing-cylinder, the sizes of said pulleys being so proportioned that said shafts 12, 13 and 14 will be driven in the same direction at progressively-different speeds, which speeds increase as the threshing-cylinder is approached, substantially as described.

In testimony whereof I affix my signature in the presence of two witnesses.

WALTER MIKS.

Witnesses:
K. M. IMBODEN,
M. L. LANGE.